(12) United States Patent
Chen et al.

(10) Patent No.: US 12,019,481 B2
(45) Date of Patent: Jun. 25, 2024

(54) KEYBOARD

(71) Applicant: Acer Incorporated, New Taipei (TW)

(72) Inventors: Hung-Chi Chen, New Taipei (TW); Cheng-Han Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/855,809

(22) Filed: Jul. 1, 2022

(65) Prior Publication Data

US 2023/0125225 A1 Apr. 27, 2023

(30) Foreign Application Priority Data

Oct. 22, 2021 (TW) .................................. 110139361

(51) Int. Cl.
*G06F 3/02* (2006.01)
*G06F 1/16* (2006.01)

(52) U.S. Cl.
CPC .......... *G06F 1/1671* (2013.01); *G06F 3/0202* (2013.01)

(58) Field of Classification Search
CPC .............................. G06F 1/1671; G06F 3/0202
See application file for complete search history.

(56) References Cited

U.S. PATENT DOCUMENTS

| | | | |
|---|---|---|---|
| 2013/0044506 A1* | 2/2013 | Chen ...................... | H01H 13/83 362/556 |
| 2014/0118264 A1* | 5/2014 | Leong ...................... | G06F 3/021 200/310 |
| 2018/0330899 A1* | 11/2018 | Chen ...................... | H03K 17/98 |

* cited by examiner

*Primary Examiner* — Robert J Michaud
(74) *Attorney, Agent, or Firm* — JCIPRNET

(57) ABSTRACT

A keyboard including an electronic paper display module, a front light module, a supporting member, a light-transmitting keycap, and an elevating support is provided. The front light module is disposed on the electronic paper display module. The supporting member is disposed on the front light module. The supporting member includes an elastic supporting protrusion and a light guide part embedded in the elastic supporting protrusion, and the elastic supporting protrusion has an opening exposing a portion of the front light module. The light guide part is located in the opening of the elastic supporting protrusion. The light-transmitting keycap is disposed on the elastic supporting protrusion and covers the opening of the elastic supporting protrusion. The elevating support is disposed between the light-transmitting keycap and the front light module.

14 Claims, 6 Drawing Sheets

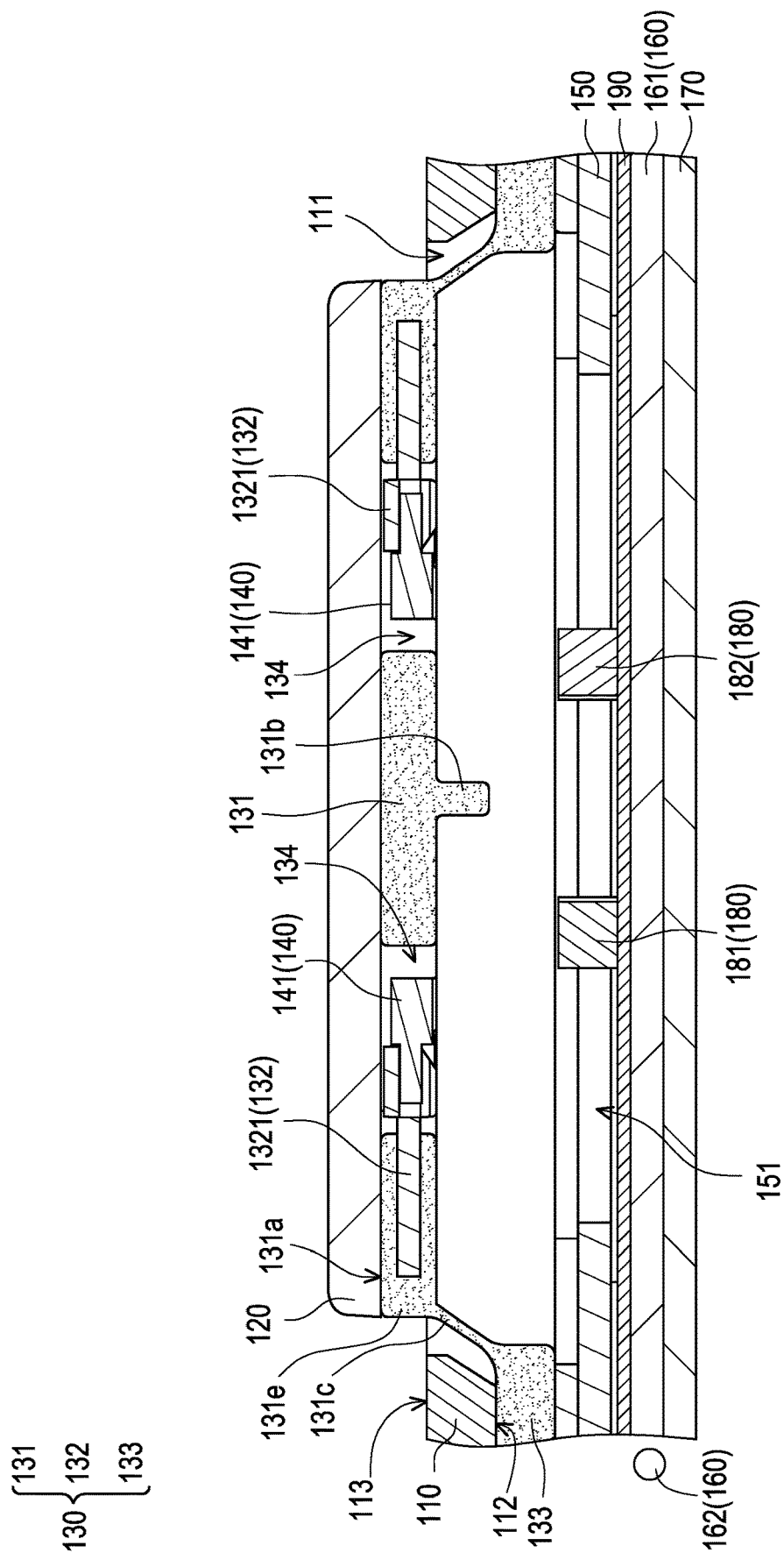

KEYBOARD

CROSS-REFERENCE TO RELATED APPLICATION

This application claims the priority benefit of Taiwanese application serial no. 110139361, filed on Oct. 22, 2021. The entirety of the above-mentioned patent application is hereby incorporated by reference herein and made a part of this specification.

BACKGROUND

Technical Field

The disclosure relates to a keyboard, and in particular to an electronic paper display keyboard.

Description of Related Art

The keyboard is a common physical operation interface and is widely used on desktops, laptops, and other electronic devices. Generally, a keyboard includes multiple key structures, and each key structure includes a keycap printed with characters for the user to press and identify. The characters on the keycaps are not readable due to the frequent contact of the user's fingers with the characters on the keycaps, which can easily become abraded.

To overcome the problem, electronic paper display keyboards are proposed. In detail, the electronic paper display keyboard uses light-transmitting keycaps (e.g., transparent keycaps or translucent keycaps) to facilitate the user to see the characters displayed on the electronic paper inside the keyboard. On the other hand, since the user can also see the internal components of the keyboard (e.g., the elevating support) through the light-transmitting keycaps, it creates a visual drawback that is not simple and affects the user's operating experience.

SUMMARY

The disclosure provides a keyboard capable of improving a user's operating experience.

The disclosure proposes a keyboard including an electronic paper display module, a front light module, a supporting member, a light-transmitting keycap, and an elevating support. The front light module is disposed on the electronic paper display module. The supporting member is disposed on the front light module. The supporting member includes an elastic supporting protrusion and a light guide part embedded in the elastic supporting protrusion, and the elastic supporting protrusion has an opening exposing a portion of the front light module. The light guide part is located in the opening of the elastic supporting protrusion. The light-transmitting keycap is disposed on the elastic supporting protrusion and covers the opening of the elastic supporting protrusion. The elevating support is disposed between the light-transmitting keycap and the front light module.

Based on the above, in the keyboard of the disclosure, an edge of the light-transmitting keycap is correspondingly provided with a light guide part, so that a portion of light projected from the front light module to the light-transmitting keycap is directed to the light guide part, and a halo effect is generated at the edge of the light-transmitting keycap. In this way, the user is not easily aware of internal components of the keyboard (e.g., the elevating support). In other words, the halo effect generated on the edge of the light-transmitting keycap may reduce visibility of the internal components of the keyboard, making an operation interface of the keyboard visually simpler to enhance the user's operating experience (e.g. visual perception).

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3D is a schematic partial cross-sectional view of FIG. 3A taken along a section line C to C.

DESCRIPTION OF THE EMBODIMENTS

Figure 1:
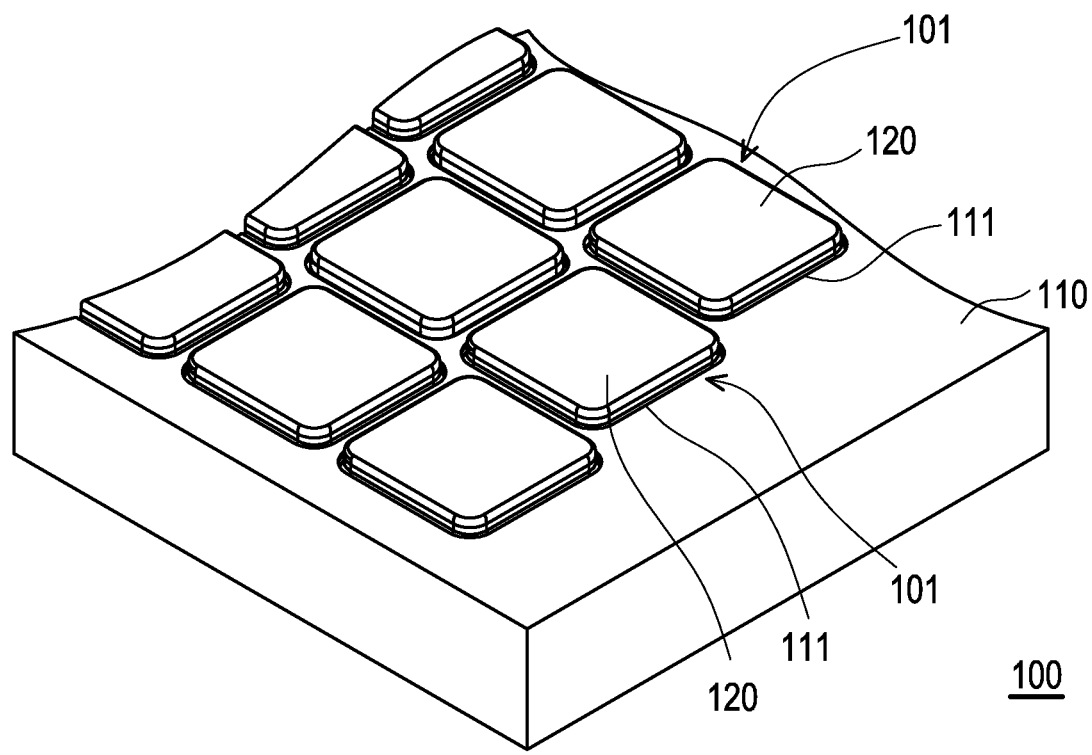
FIG. 1 is a partial schematic view of a keyboard according to an embodiment of the disclosure.

FIG. 1 is a partial schematic view of a keyboard according to an embodiment of the disclosure e. Referring to FIG. 1, according to this embodiment, a keyboard 100 may be an electronic paper display keyboard, and includes multiple key structures 101 and a housing 110 for carrying the key structures 101. The housing 110 has multiple openings 111 and each of the openings 111 is used for accommodating the key structures 101. In detail, each of the key structures 101 includes a light-transmitting keycap 120, such as a transparent keycap or a translucent keycap, to facilitate the user's view of characters displayed on an electronic paper inside the keyboard 100.

Figure 2:
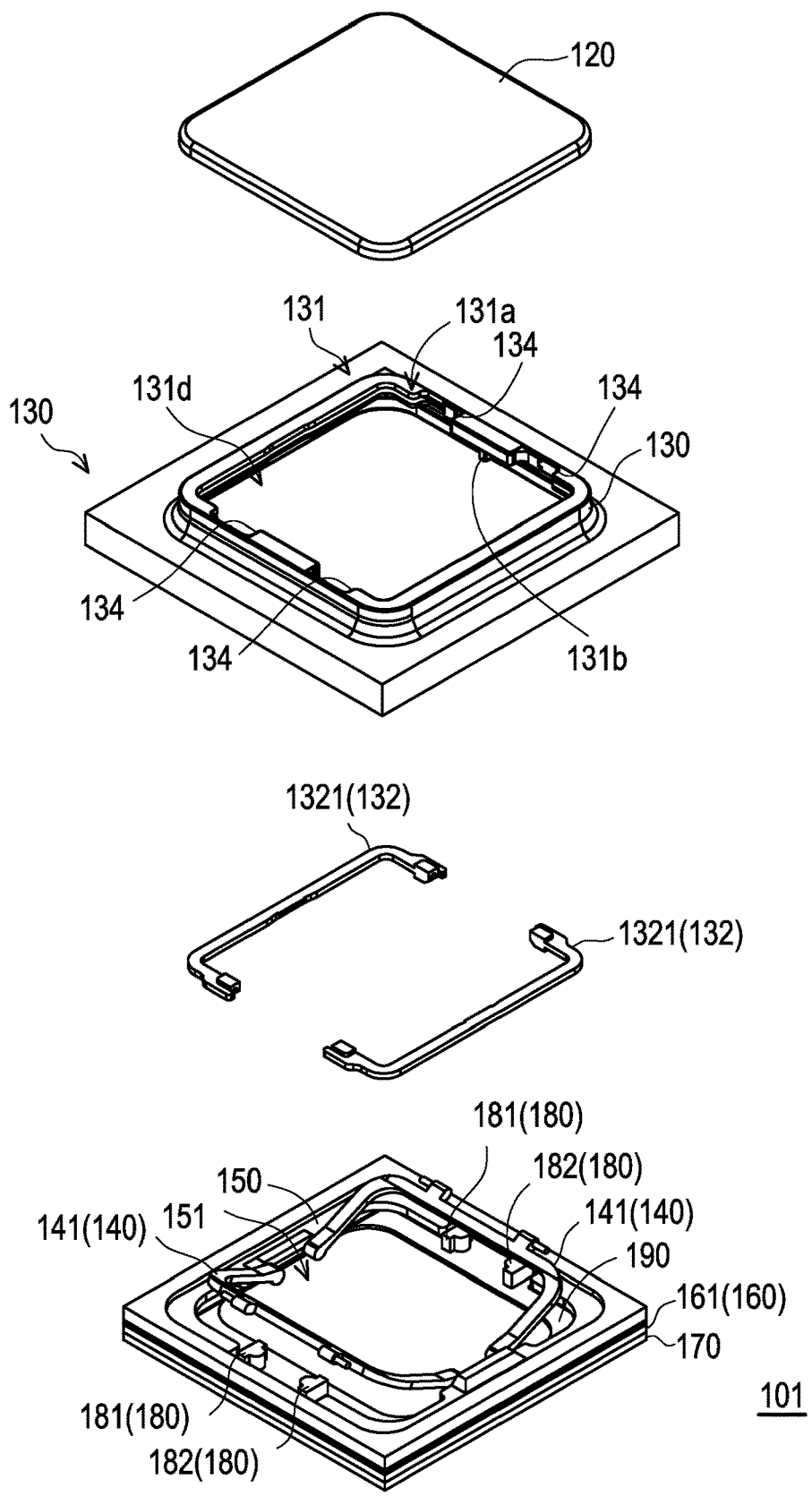
FIG. 2 is a partial exploded schematic view of a key structure in the keyboard of FIG. 1.
Figure 3A:
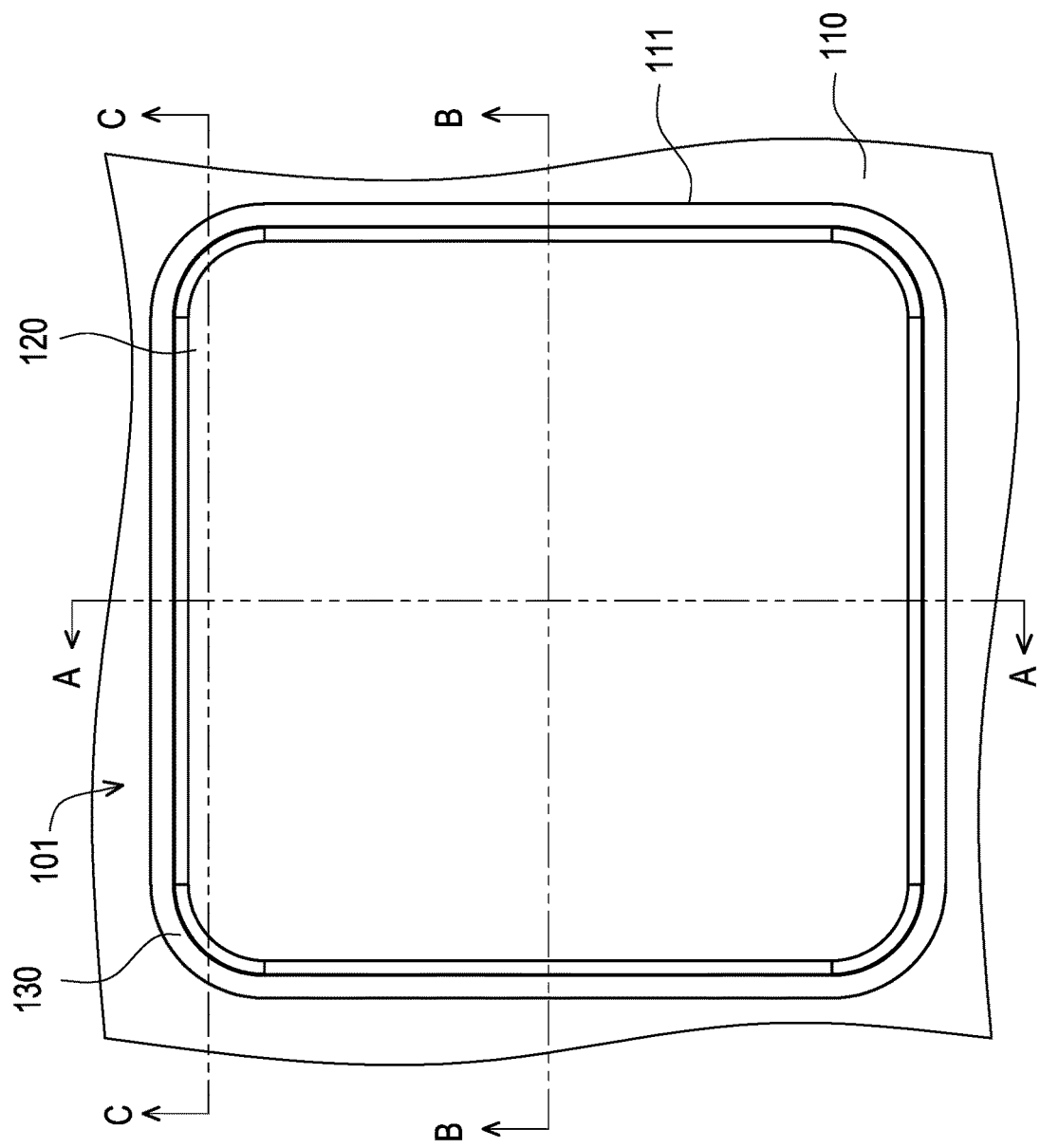
FIG. 3A is a partial schematic top view of a key structure in the keyboard of FIG. 1.
Figure 3B:
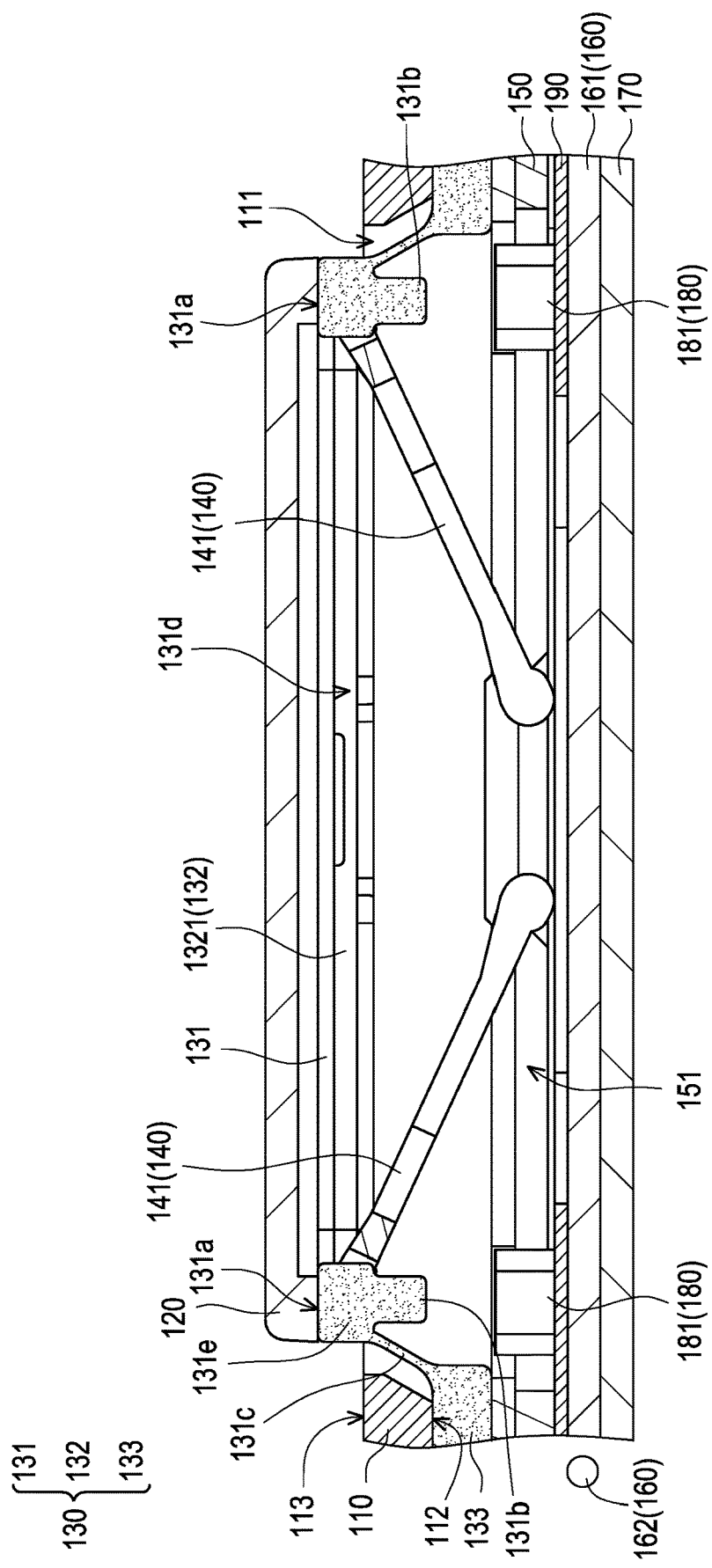
FIG. 3B is a schematic partial cross-sectional view of FIG. 3A taken along a section line A to A.

FIG. 2 is a partial exploded schematic view of a key structure in the keyboard of FIG. 1. FIG. 3A is a partial schematic top view of a key structure in the keyboard of FIG. 1. FIG. 3B is a schematic partial cross-sectional view of FIG. 3A taken along a section line A to A. Referring to FIG. 2, FIG. 3A, and FIG. 3B, an orthographic projection of each of the light-transmitting keycap 120 falls in a corresponding opening 111, and is suitable for moving into or out of the housing 110 through the corresponding opening 111. Specifically, the each of the key structures 101 includes a light-transmitting keycap 120, a supporting member 130, an elevating support 140, a frame 150, a front light module 160, and an electronic paper display module 170, and the following is a description of structural configuration of one of the key structures 101.

Referring to FIG. 2 and FIG. 3B, according to this embodiment, the front light module 160 includes a light guide plate 161 and a light source 162 disposed around the light guide plate 161, and the light guide plate 161 is disposed on the electronic paper display module 170. The supporting member 130 and the frame 150 are disposed on the light guide plate 161. The frame 150 is located between the supporting member 130 and the light guide plate 161, and the light-transmitting keycap 120 is attached to the supporting member 130. That is, the light-transmitting keycap 120 and the frame 150 are respectively located on opposite sides of the supporting member 130.

The elevating support 140 is disposed between the light-transmitting keycap 120 and the light guide plate 161, and opposite ends of the elevating support 140 are respectively connected to the supporting member 130 and the frame 150. When the light-transmitting keycap 120 is pressed down, the support member 130 is elastically deformed (e.g., compressionally deformed) and the elevating support 140 sinks downward. When downward pressure applied to the light-transmitting keycap 120 is removed, elasticity of the supporting member 130 simultaneously lifts the light-transmitting keycap 120 and the elevating support 140 upward.

Figure 3C:
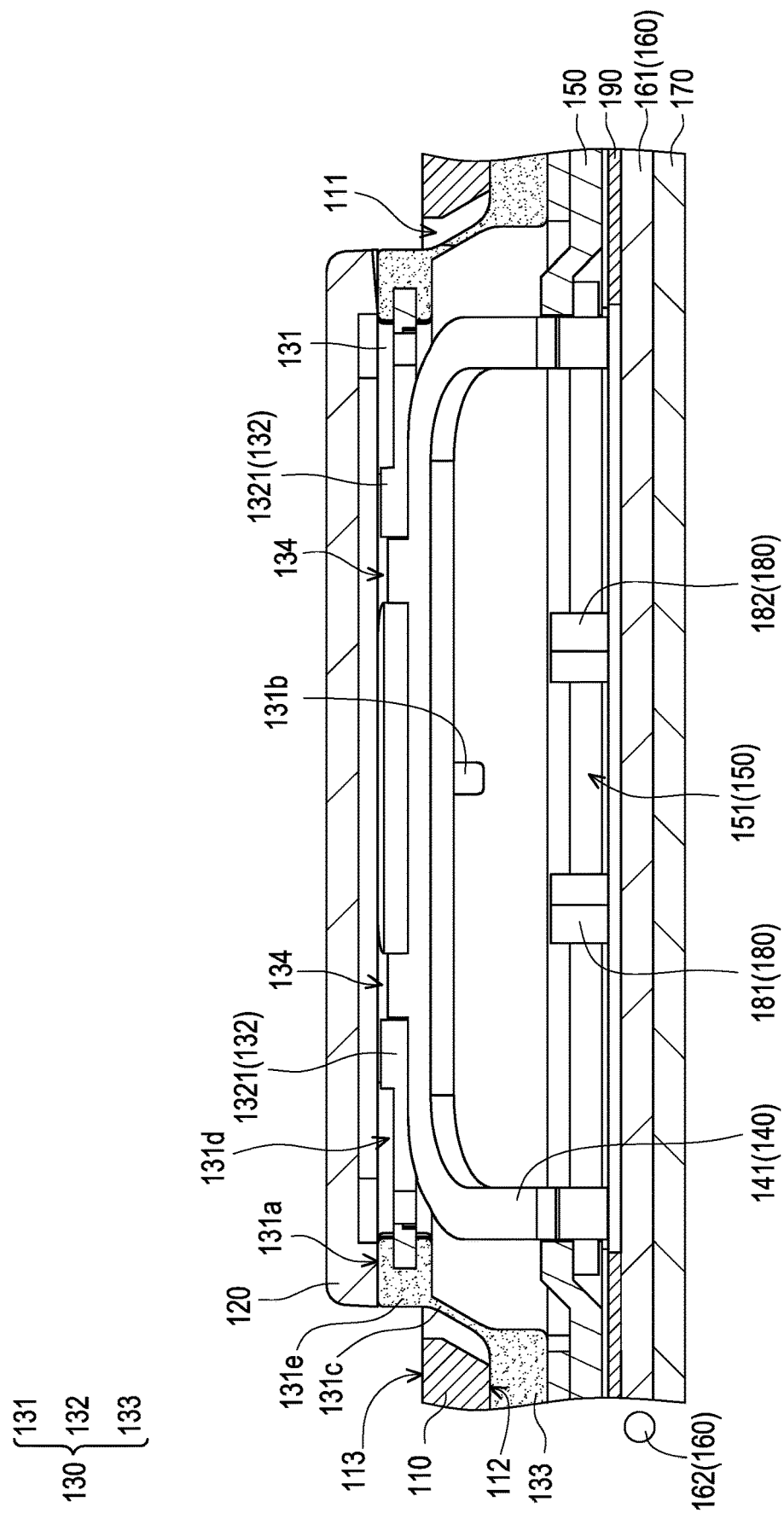
FIG. 3C is a schematic partial cross-sectional view of FIG. 3A taken along a section line B to B.

FIG. 3C is a schematic partial cross-sectional view of FIG. 3A taken along a section line B to B. FIG. 3D is a schematic partial cross-sectional view of FIG. 3A taken along a section line C to C. Referring to FIG. 2 and FIG. 3B to FIG. 3D, according to this embodiment, the supporting member 130 includes an elastic supporting protrusion 131 and a light guide part 132 embedded in the elastic supporting protrusion 131. The elastic supporting protrusion 131 may be made of rubber, silicone, or other elastic materials, and the light guide part 132 may be made of plastic, acrylic, other light-transmitting materials, other transparent materials, or other light guide materials. For example, the supporting member 130 can be made by overmolding technique.

In detail, the elastic supporting protrusion 131 has an opening 131d. The light-transmitting keycap 120 is attached to the elastic supporting protrusion 131 and covers the opening 131d. On the other hand, the frame 150 has an opening 151, and the opening 131d of the elastic supporting protrusion 131 overlaps the opening 151 of the frame 150 to expose a portion of the light guide plate 161 and serve as a path for light to be projected outward. The light guide part 132 includes two light guide members 1321 symmetrically disposed in the opening 131d of the elastic supporting protrusion 131. Each of the light guide members 1321 is distributed substantially along an edge of the opening 131d of the elastic supporting protrusion 131 and an edge of the light-transmitting keycap 120, or rather, the each of the light guide members 1321 extends substantially along the edge of the opening 131d of the elastic supporting protrusion 131 and the light-transmitting keycap 120.

Therefore, light projected from the light guide plate 161 toward the light-transmitting keycap 120 first passes through the opening 151 of the frame 150 and then into the opening 131d of the elastic supporting protrusion 131. After that, a portion of the light is directed into the light-transmitting keycap 120, and another portion of the light is directed into the light guide part 132, and a halo effect is generated at the edge of the light-transmitting keycap 120 so that the user is not easily aware of internal components (e.g., the elevating support 140) of the keyboard 100 (see FIG. 1).

In other words, the halo effect generated at the edge of the light-transmitting keycap 120 may reduce visibility of the internal components of the keyboard 100 (see FIG. 1), making an operation interface of the keyboard visually simpler to enhance the user's operating experience (e.g. visual perception). In addition, the halo effect generated at the edge of the light-transmitting keycap 120 may also have a visual effect of amplifying a pressing range or pressing area of the light-transmitting keycap 120.

Referring to FIG. 2, FIG. 3B, and FIG. 3C, according to this embodiment, the elastic supporting protrusion 131 passes through the opening 131d of the housing 110. The elastic supporting protrusion 131 has a bearing surface 131a surrounding the opening 131d, and the light-transmitting keycap 120 is attached to the bearing surface 131a to cover the opening 131d. On the other hand, the elevating support 140 is disposed in the opening 131d of the elastic supporting protrusion 131 and the opening 151 of the frame 150, and the opposite ends of the elevating support 140 are respectively connected to the light guide part 132 and the frame 150.

Furthermore, the elevating support 140 includes two brackets 141 in symmetrical configuration. A bottom end of each of the bracket 141 is connected to the frame 150, and a top end of the each of the bracket 141 is connected to the light guide part 132. More specifically, the two light guide members 1321 are distributed around the two brackets 141, and opposite ends of the each of the light guide members 1321 are respectively connected to top ends of the two brackets 141, or alternatively, the top ends of the two brackets 141 fall partially between the two light guide members 1321 and connect the two light guide members 1321. On the other hand, the supporting member 130 further has multiple grooves 134 on the elastic supporting protrusion 131. The top ends of the two brackets 141 fall partially into the grooves 134 respectively, and the two light guide members 1321 extend partially into the grooves 134 respectively to connect to the top ends of the two brackets 141.

Referring to FIG. 2, FIG. 3C, and FIG. 3D, according to this embodiment, the key structures 101 further include a light sensor 180 disposed on the light guide plate 161, and the supporting member 130 further includes a trigger part 131b protruding from the elastic supporting protrusion 131. In detail, the trigger part 131b is located between the elastic supporting protrusion 131 and the light guide plate 161, and the light sensor 180 is located on one side of a movement path of the trigger part 131b.

The key structures 101 further include a circuit board 190 disposed between the light guide plate 161 and the frame 150. The light sensor 180 is electrically connected to the circuit board 190 and is located in the opening 151 of the frame 150. Furthermore, the light sensor 180 includes a light transmitter 181 and a light receiver 182, and the light transmitter 181 and the light receiver 182 are respectively located on opposite sides of the movement path of the trigger part 131b. When the trigger part 131b is moved to the circuit board 190 and blocks a light transmission and reception path between the light transmitter 181 and the light receiver 182, the light receiver 182 generates a corresponding trigger signal. The trigger signal is transmitted to a processor, and the processor determines, based on the trigger signal, that there is a pressing behavior on the key structures 101.

Referring to FIG. 3B to FIG. 3D, according to this embodiment, the supporting member 130 includes a base 133. The elastic supporting protrusion 131 protrudes from the base 133, and the housing 110 is pressed against the base 133. Therefore, an action of the elastic supporting protrusion 131 in any one of the key structures 101 does not affect the elastic supporting protrusion 131 in other surrounding key structures 101 through the base 133, so as to improve operational reliability.

In detail, the housing 110 has a top surface 113 and a bottom surface 112 opposite to the top surface 113. The opening 111 of the housing 110 penetrates the top surface 113 and the bottom surface 112, and the bottom surface 112 contacts the base 133. In addition, the elastic supporting protrusion 131 passes through the opening 111 of the housing 110, and a portion of the elastic supporting protrusion 131 protrudes from the top surface 113 of the housing 110.

According to this embodiment, the elastic supporting protrusion 131 is substantially composed of a side wall part 131c and a bearing part 131e. The light guide part 132 is embedded in the bearing part 131e, and the bearing surface 131a falls on the bearing part 131e. Opposite ends of the side wall part 131c are respectively connected to the base 133 and the bearing part 131e. In order to improve smoothness of the action of the elastic supporting protrusion 131, the bearing part 131e and the side wall part 131c are kept in a gap with an inner wall surface of the opening 111.

On the other hand, a thickness of the side wall part 131c is smaller than a thickness of the bearing part 131e, which is a structural weakness of the elastic supporting protrusion 131. Therefore, when the keycap 120 is pressed down, stresses acting on the elastic supporting protrusion 131 are concentrated on the side wall part 131c, resulting in a collapse deformation, which provides the user with tactile bump feedback in terms of operation. Further, the side wall part 131c serves as a main elastic deformation part of the elastic supporting protrusion 131, and therefore provides the required restoring force when the key structures 101 are lifted upward.

In summary, in the keyboard of the disclosure, an edge of the light-transmitting keycap is correspondingly provided with a light guide part, so that a portion of light projected from the front light module to the light-transmitting keycap is directed to the light guide part, and a halo effect is generated at the edge of the light-transmitting keycap. In this way, the user is not easily aware of internal components of the keyboard (e.g., the elevating support). In other words, the halo effect generated on the edge of the light-transmitting keycap may reduce visibility of the internal components of the keyboard, making an operation interface of the keyboard visually simpler to enhance the user's operating experience (e.g. visual perception).

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A keyboard comprising: an electronic paper display module; a front light module disposed on the electronic paper display module; a supporting member disposed on the front light module, wherein the supporting member comprises an elastic supporting protrusion and a light guide part embedded in the elastic supporting protrusion, the elastic supporting protrusion has an opening exposing a portion of the front light module, and the light guide part is located in the opening of the elastic supporting protrusion; a light-transmitting keycap disposed on the elastic supporting protrusion, and covering the opening of the elastic supporting protrusion, an elevating support disposed between the light-transmitting keycap and the front light module; and a frame disposed on the front light module and located between the front light module and the supporting member, wherein the elevating support includes two brackets, and a top end and a bottom end of each of the two brackets are respectively connected to the light guide part and the frame.

2. The keyboard according to claim 1, wherein the light guide part comprises two light guide members symmetrically disposed in the opening of the elastic supporting protrusion.

3. The keyboard according to claim 1, wherein the supporting member further comprises a trigger part protruding from the elastic supporting protrusion, the trigger part is located between the elastic supporting protrusion and the front light module, and the keyboard also comprises a sensor, wherein the sensor is disposed on the front light module corresponding to the trigger part.

4. The keyboard according to claim 3, wherein the sensor comprises a light transmitter and a light receiver, and the light transmitter and the light receiver are located on opposite sides of a movement path of the trigger part.

5. The keyboard according to claim 1, wherein the frame has an opening overlapping the opening of the elastic supporting protrusion and exposing the portion of the front light module.

6. The keyboard according to claim 5, wherein the elevating support is disposed in the opening of the elastic supporting protrusion and the opening of the frame.

7. The keyboard according to claim 1, wherein the elastic supporting protrusion has a bearing surface surrounding the opening, and the light-transmitting keycap is attached to the bearing surface of the elastic supporting protrusion.

8. The keyboard according to claim 1 further comprising:
a housing disposed on the supporting member, wherein the housing has an opening, and the elastic supporting protrusion passes through the opening of the housing.

9. The keyboard according to claim 8, wherein the housing has a top surface and a bottom surface opposite to the top surface, the opening of the housing penetrates the top surface and the bottom surface, and the supporting member further comprises a base, wherein the elastic supporting protrusion protrudes from the base, and the bottom surface of the housing contacts the base.

10. The keyboard according to claim 1, wherein the two brackets are in symmetrical configuration.

11. The keyboard according to claim 2, wherein the two light guide members are distributed around the two brackets, and two opposite ends of the each of the light guide members are respectively connected to the top ends of the two brackets.

12. The keyboard according to claim 2, wherein the top end of each of the two brackets fall partially between the two light guide members and connects the two light guide members.

13. The keyboard according to claim 2, wherein the supporting member further has multiple grooves on the elastic supporting protrusion and the top ends of the two brackets fall partially into the grooves respectively, the two light guide members extend partially into the grooves respectively to connect the top ends of the two brackets.

14. The keyboard according to claim 1, wherein the light guide part is distributed along the edge of the light-transmitting keycap to generate a halo effect.

* * * * *